3,554,719
METALLIC ROTORS FOR FORMING GLASS FIBERS
Stanley George Benner, South Plainfield, N.J., assignor to Johns-Manville Corporation, New York, N.Y., a corporation of New York
No Drawing. Continuation-in-part of application Ser. No. 714,075, Mar. 18, 1968, which is a continuation-in-part of application Ser. No. 517,794, Dec. 30, 1965. This application Nov. 19, 1968, Ser. No. 777,201
Int. Cl. C03b 37/04
U.S. Cl. 65—1
5 Claims

ABSTRACT OF THE DISCLOSURE

Glass fiberizing centrifugal rotor of improved metallic alloy containing chromium, iron, silicon, manganese and cobalt providing extended service life.

CROSS-REFERENCE TO RELATED APPLICATION

This application is a continuation-in-part application of my copending U.S. patent application Ser. No. 714,075, filed Mar. 18, 1968, now abandoned, which in turn was a continuation-in-part application of my then copending but now abandoned application Ser. No. 517,794, filed Dec. 30, 1965.

BACKGROUND OF THE INVENTION

This invention relates to a rotor for use in the centrifugal initiation of filaments of molten glass, and in particular to a metallic alloy for use in forming such rotor. The rotors to which the instant invention is directed are those similar to the type illustrated in U.S. Pats. Nos. 3,109,736 and 3,205,055.

SUMMARY OF THE INVENTION

In the so-called rotary or centrifugal process for forming glass fibers, a molten stream of glass is deposited on a rapidly rotating rotor provided at its periphery with a wall having a plurality of openings formed therein through which the molten glass issues in the form of filaments. As the filaments issue from the openings in the peripheral wall, they are subjected to the action of a high velocity, high temperature gaseous blast to attenuate the filaments into fine diameter fibers. One of the difficulties encountered in this system for the formation of glass fibers relates to the operating life of the rotor. One major factor in determining the operating life of the rotor is the size of the openings from which the filaments issue. As the molten glass passes through the opening, it wears away the metallic alloy forming the peripheral wall of the rotor. When these openings become too large, the rotor must be discarded.

It is a primary object of the instant invention to provide a metallic alloy for use in forming a rotor of the type used in the rotary system of glass fiberization.

DESCRIPTION OF THE PREFERRED EMBODIMENTS

The foregoing object is accomplished in accordance with the instant invention by forming at least the peripheral wall of the rotor from the metallic alloy comprising: chromium, iron, carbon, silicon, cobalt, manganese, and in some instances very small quantities of tungsten, nickel, and molybdenum. The proportions of the principal ingredients of this alloy fall within the following approximate limits:

|  | Percent |
|---|---|
| Chromium | 25–32 |
| Iron | 15–25 |
| Carbon | <0.3 |
| Silicon | 0.05–2.5 |
| Cobalt | 40–58 |
| Manganese | 0.2–2.0 |

A portion of the cobalt not to exceed 4%, may be replaced by nickel. Tungsten may be present in minor amounts ranging from 0 up to about 1.25% and other possible trace elements frequently entrained in the raw materials comprise molybdenum, phosphorus, sulphur, aluminum, boron, and magnesium.

It has been fond in actual operation that rotors made in accordance with the instant invention have a life of operation at least three or four times greater than those previously used in a commercial operation producing glass fibers by a rotary system of glass fiberization. The measurements from which the extended life of these rotors was determined were made utilizing rotors made from the old alloy and rotors made from new alloys of the instant invention in a rotary system of glass fiberization. The molten glass used in these determinations had the following approximate composition:

|  | Percent |
|---|---|
| Silicon dioxide ($SiO_2$) | 58.24 |
| Iron oxide ($Fe_2O_3$) | 0.12 |
| Aluminum oxide ($Al_2O_3$) | 1.91 |
| Chromic oxide ($Cr_2O_3$) | <0.01 |
| Zirconium dioxide ($ZrO_2$) | <0.01 |
| Calcium oxide (CaO) | 8.92 |
| Magnesium oxide (MgO) | 4.24 |
| Sodium oxide ($Na_2O$) | 15.43 |
| Potassium oxide ($K_2O$) | 0.15 |
| Boric oxide ($B_2O_3$) | 10.78 |
| Sulphur trioxide ($SO_3$) | 0.21 |
| Total | 100.00 |

A rotor typical of those previously used in a commercial operation for producing glass fibers in a rotary system of fiberization was comprised of the following composition:

|  | Percent |
|---|---|
| Nickel | 9 |
| Cobalt | 53.95 |
| Chromium | 19.0 |
| Tungsten | 14.0 |
| Iron | 3.0 |
| Carbon | 0.05 |
| Silicon | 1.00 |
| Manganese | 1.00 |

The improved results of the instant invention were obtained with rotors made from an alloy having the following composition:

EXAMPLE I

|  | Percent |
|---|---|
| Chromium | 27.66 |
| Tungsten | 0.68 |
| Iron | 20.10 |
| Carbon | 0.10 |
| Silicon | 0.16 |
| Cobalt | 48.51 |
| Nickel | 1.95 |
| Manganese | 0.44 |
| Molybdenum | 0.40 |

The improved results of the instant invention were also obtained with rotors made from an alloy having the following composition:

EXAMPLE II

| | Percent |
|---|---|
| Chromium | 28.61 |
| Tungsten | 0.52 |
| Iron | 19.30 |
| Carbon | 0.12 |
| Silicon | 0.34 |
| Cobalt | 49.25 |
| Nickel | 1.00 |
| Manganese | 0.62 |
| Molybdenum | 0.21 |
| Phosphorus | 0.016 |
| Sulphur | 0.015 |

EXAMPLE III

| | Percent |
|---|---|
| Chromium | 27.44 |
| Tungsten | 0.70 |
| Iron | 19.60 |
| Carbon | 0.085 |
| Silicon | 0.40 |
| Cobalt | 51.97 |
| Nickel | 1.74 |
| Manganese | 0.74 |
| Molybdenum | 0.26 |
| Phosphorus | 0.011 |
| Sulphur | 0.01 |
| Aluminum | 0.02 |
| Boron | 0.01 |
| Magnesium | 0.01 |

EXAMPLE IV

| | Percent |
|---|---|
| Chromium | 28.00 |
| Iron | 18.00 |
| Silicon | 1.80 |
| Cobalt | 51.00 |
| Nickel | 0.25 |
| Manganese | 1.20 |
| Molybdenum | 0.15 |

Rotors made in accordance with the instant invention provide the great advantage over those previously used of being able to provide filaments of molten glass of more uniform diameter over a longer period of time. Therefore, the fibrous products made from fibers formed from these filaments will be more uniform and conform more closely to the desired product specification.

In addition to the peripheral wall of the rotor, other components or sections thereof can also be constructed of the alloys of this invention, including for example the base and the top or shield, or the complete unit.

It is understood that the foregoing details are given for purposes of illustration only, and that these details need not be strictly adhered to and that various changes and modifications may suggest themselves to one skilled in the art, all falling within the scope of the invention as defined by the subjoined claims.

What I claim is:

1. In a rotary system of glass fiberization having a rotor comprising a hollow, rotatable, metallic body having a peripheral wall with a plurality of openings therein, the improvement comprising forming at least the peripheral wall of said rotor from a metallic alloy consisting essentially of the following ingredients in the respective approximate amounts by weight:

| | Percent |
|---|---|
| Chromium | 25–32 |
| Iron | 15–25 |
| Carbon | <0.3 |
| Silicon | 0.05–2.5 |
| Cobalt combined with nickel (with the nickel content not to exceed about 4%) | 40–58 |
| Manganese | 0.2–2.0 |

2. A rotor as defined in claim 1 wherein said metallic alloy comprises the following ingredients in the approximate amounts by weight:

| | Percent |
|---|---|
| Chromium | 27.66 |
| Tungsten | 0.68 |
| Iron | 20.10 |
| Carbon | 0.10 |
| Silicon | 0.16 |
| Cobalt | 48.51 |
| Nickel | 1.95 |
| Manganese | 0.44 |
| Molybdenum | 0.40 |

3. A rotor as defined in claim 1 wherein said metallic alloy comprises the following ingredients in the respective approximate amounts by weight:

| | Percent |
|---|---|
| Chromium | 28.61 |
| Tungsten | 0.52 |
| Iron | 19.30 |
| Carbon | 0.12 |
| Silicon | 0.34 |
| Cobalt | 49.25 |
| Nickel | 1.00 |
| Manganese | 0.62 |
| Molybdenum | 0.21 |
| Phosphorus | 0.016 |
| Sulphur | 0.015 |

4. A rotor as defined in claim 1 wherein said metallic alloy comprises the following ingredients in the respective approximate amounts by weight:

| | Percent |
|---|---|
| Chromium | 27.44 |
| Tungsten | 0.70 |
| Iron | 19.60 |
| Carbon | 0.085 |
| Silicon | 0.40 |
| Cobalt | 51.97 |
| Nickel | 1.74 |
| Manganese | 0.74 |
| Molybdenum | 0.26 |
| Phosphorus | 0.011 |
| Sulphur | 0.01 |
| Aluminum | 0.02 |
| Boron | 0.01 |
| Magnesium | 0.01 |

5. A rotor as defined in claim 1 wherein said metallic alloy comprises the following ingredients in the respective approximate amounts by weight:

| | Percent |
|---|---|
| Chromium | 28.00 |
| Iron | 18.00 |
| Silicon | 1.80 |
| Cobalt | 51.00 |
| Nickel | 0.25 |
| Manganese | 1.20 |
| Molybdenum | 0.15 |

References Cited

UNITED STATES PATENTS

| | | | |
|---|---|---|---|
| 2,607,170 | 8/1952 | De Vries | 75—171A |
| 3,205,055 | 9/1965 | Laurent et al. | 65—374X |
| 3,312,537 | 4/1967 | Jewell | 65—1UX |
| 3,318,694 | 5/1967 | Heitmann | 65—374UX |
| 3,355,287 | 11/1967 | Cape | 75—170 |
| 3,384,478 | 5/1968 | Firnhaber | 65—1X |

S. LEON BASHORE, Primary Examiner

R. L. LINDSAY, JR., Assistant Examiner

U.S. Cl. X.R.

65—374, 15; 75—171